United States Patent [19]

Fochler et al.

[11] Patent Number: 4,864,080
[45] Date of Patent: Sep. 5, 1989

[54] TERMINATOR CONNECTOR FITTING FOR ELECTRICAL BOX AND CONDUIT SYSTEM

[75] Inventors: Helmut P. Fochler, Chagrin Falls, Ohio; Joseph Urkewich; Daryl J. Sauerbrei, both of Clinton, Iowa

[73] Assignee: The Carlon Company, Cleveland, Ohio

[21] Appl. No.: 56,424

[22] Filed: Jun. 1, 1987

[51] Int. Cl.⁴ .............................................. H02G 3/08
[52] U.S. Cl. .................................. 174/65 G; 285/162
[58] Field of Search ............. 174/65 R, 65 G, 152 G, 174/153 G; 285/162, 419, 903; 248/56; 439/465, 466, 467, 557, 567; 16/2

[56] References Cited

U.S. PATENT DOCUMENTS

| | | | |
|---|---|---|---|
| 2,420,826 | 5/1947 | Irrgang | 174/153 G |
| 2,505,312 | 4/1950 | Wagner | 285/161 |
| 2,952,730 | 9/1960 | Simonds | 174/153 G |
| 4,248,459 | 2/1981 | Pate et al. | 285/319 |
| 4,302,035 | 11/1981 | Ochwat | 285/158 |
| 4,494,779 | 1/1985 | Neff et al. | 285/159 |
| 4,578,528 | 3/1986 | Borsh et al. | 174/65 G |
| 4,616,105 | 10/1986 | Borsh | 174/65 R |
| 4,711,472 | 12/1987 | Schnell | 285/162 |

Primary Examiner—Arthur T. Grimley
Assistant Examiner—David A. Tone
Attorney, Agent, or Firm—Laney, Dougherty, Hessin & Beavers

[57] ABSTRACT

A terminator fitting useful for connecting corrugated tubing to an electrical outlet box and including a cylindrical collar having first and second ends and a rib projecting radially inwardly from the collar for engaging an external rib on corrugated tubing placed within the collar. The collar carries circumferentially-spaced, axially projecting projections on one of its ends, with each such projection including a wedge-shaped free end portion. Each wedge-shaped end portion is joined to the first end of the collar by a web portion. The web portion, free end portion and collar define a groove for engaging the side wall of an outlet box when the arcuate projections are forced through an opening in the box to secure the fitting in the box. A plurality of blocking flanges are included in the terminator fitting with each blocking flange extending in a circumferential direction from a lateral edge of one of the wedge-shaped free end portions.

20 Claims, 2 Drawing Sheets

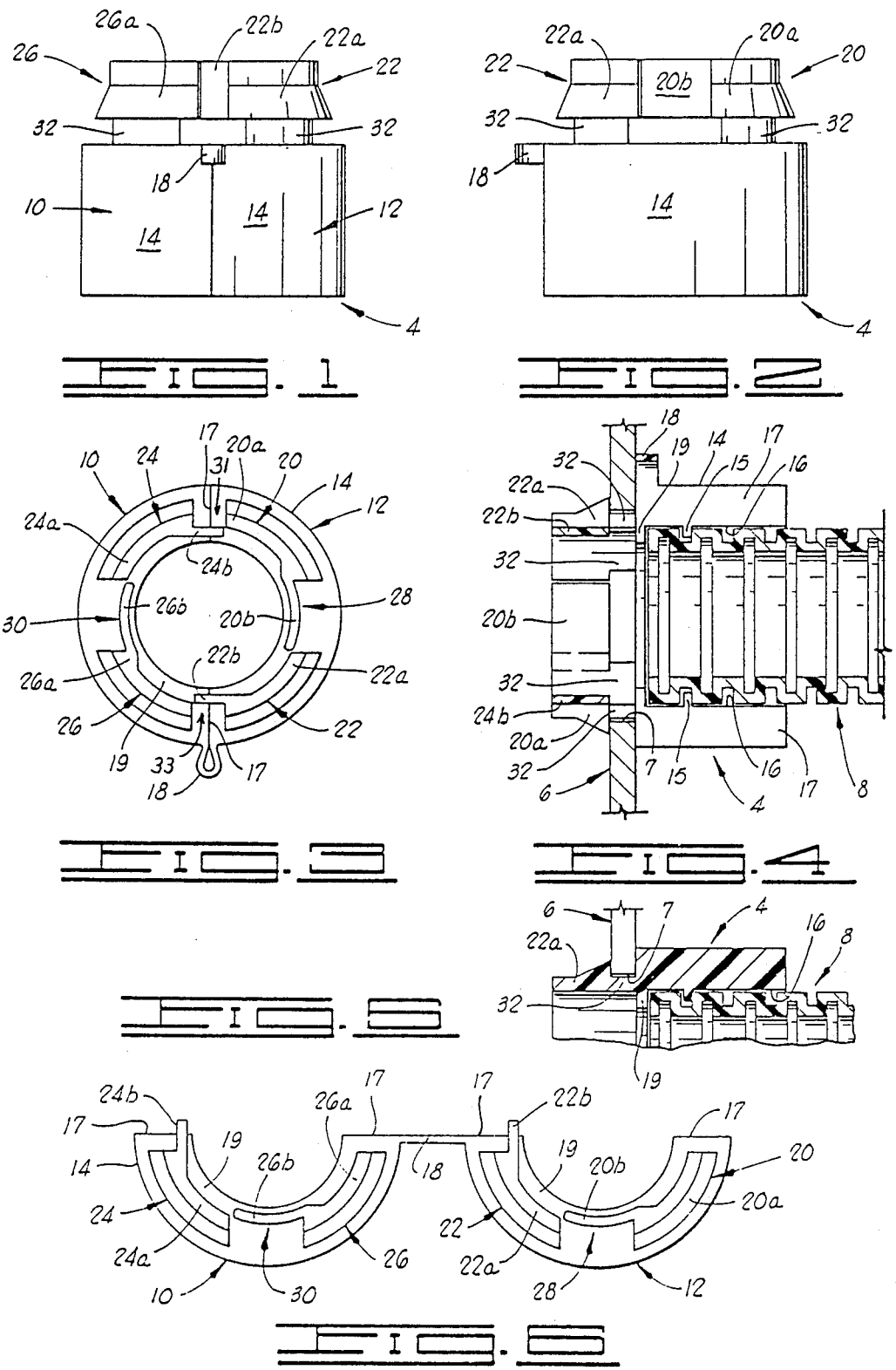

TERMINATOR CONNECTOR FITTING FOR ELECTRICAL BOX AND CONDUIT SYSTEM

FIELD OF THE INVENTION

This invention relates to an electrical conduit system which includes a flexible corrugated conduit, an electrical outlet box of synthetic resin and a terminator connector fitting by which the corrugated conduit is connected to the electrical outlet box. The invention more specifically relates, in one aspect and without limitation, to a novel terminator connector fitting which is snapped into an opening in an electrical outlet box, and is used to connect to the outlet box, a flexible corrugated conduit which functions as a raceway for electrical conductors extended into the box and connected to terminals therewithin.

BACKGROUND OF THE INVENTION

1. Brief Description of the Prior Art

U.S. Pat. No. 4,494,779, assigned to the assignee of the present invention, describes a terminator connector fitting by which corrugated conduit is connected to an electrical outlet box. The terminator fitting and the corrugated conduit are made of a synthetic resin material, and are characterized by flexibility and limited resiliency. The terminator fitting described in U.S. Pat. No. 4,494,779 is adapted to be forced, as facilitated by the resilient yielding of parts of the fitting, partially through an opening in a side wall of an electrical outlet box. The terminator fitting then snaps into position as the portion of the box defining this opening engages a recess or groove formed in the terminator fitting.

To facilitate insertion of a portion of the terminator fitting into the opening through the wall of the box, the terminator fitting includes a pair of semi-cylindrical collars which can be interconnected, and each of which carries two spaced, box-engaging projections which extend axially from each of the collars and are yieldable radially inwardly sufficiently to permit them to be forced through the opening in the electrical outlet box. The inner side of each of the semi-cylindrical collars is grooved and ribbed to mate with, and engage, corrugations carried on a corrugated conduit to be connected to the electrical outlet box. Each box-engaging projection includes a wedge-shaped free end portion, and also a web portion by which the wedge-shaped free end portion is connected to the respective semi-cylindrical collar upon which it is carried. Each wedge-shaped end portion, associated web portion, and the semi-cylindrical collar to which the respective web portion is connected, define an arcuate channel, groove or relief for receiving and engaging the portion of the wall of the electrical box which surrounds and defines the opening into which the terminator fitting is snapped in assembling the system.

Each of the box-engaging projections is spaced from the adjacent box-engaging projection by a substantial circumferential distance, considered as an arc of a circle, and this spacing serves several functions. First, it requires less material when the terminator fitting is molded of plastic. More importantly, the spacing allows the arcuate dimension of each of the box-engaging projections to be sufficiently small that the respective projection can flex or bend about the web portion by which the respective box-engaging projection is connected to the semi-cylindrical collar upon which it is carried. Further, in providing the circumferential space between adjacent box-engaging projections, each of these projections can flex or bend in a radially inwardly direction as much as is required to permit it to be passed through the generally circular opening in an electrical outlet box. Such opening has a diametric dimension which is less than the outside diameter of the circle which passes through, and includes the largest outside dimension of the several box-engaging arcuate projections when they are collectively considered as a cylindrical array and are in a relaxed, undeflected condition. Without such spacing between the box-engaging projections, they would interfere with each other as they tend to flex radially inwardly, and such radially inward flexure would be limited, in many cases, to an extent such that the terminator fitting could not be forced through the opening in the wall of the electrical outlet box.

Though the necessary freedom of flexing movement is gained in the terminator fitting by providing the described spacing between adjacent box-engaging projections carried on each of the semi-cylindrical collars, it has been found that in the case of some electrical conductor installations where wires are extended through the corrugated conduit engaged by the terminator fitting and into the electrical outlet box, a problem comes to exist as a result of the spacing between the box-engaging projections. This problem is that the portions of the electrical conductors located inside the electrical outlet box, after passing through the corrugated conduit and the terminator fitting, tend to pull back into the space or gap between adjacent box-engaging projections, and to become restricted in their freedom of movement at the free end portions of the electrical conductors and wires. This makes it more difficult to manipulate the conductors as necessary for connection to terminals within the box. Importantly also, on occasion the electrical conductors, after connection within the electrical outlet box, will be pulled into the gap or space between adjacent box-engaging projections of the terminator fitting, and will work against the side edges of one of the projections until the insulation on the conductor is destroyed. Occasionally the conductor is completely severed.

For all of the foregoing reasons, the terminator connector fitting described in U.S. Pat. No. 4,494,779 works well in many installations, and provides a highly useful fitting which can be quickly installed in an electrical outlet box to establish a connection between a corrugated conduit and the box, but such terminator fittings nevertheless do not provide optimum performance in all modes of usage.

2. Brief Description of the Present Invention

This invention provides a terminator fitting of synthetic resin which can be quickly snapped into an opening provided in an electrical outlet box, and there function to retain a corrugated conduit in position relative to the box and the opening so that a system can thus be constructed which more effectively guides and protects electrical conductors used in a system of electrical service. Although the terminator fitting preferably, and most frequently, will be used with an electrical outlet box made of a synthetic resin material, and with a corrugated conduit also made of such material, the terminator fitting can be employed with metallic electrical outlet boxes.

Broadly described, the terminator fitting of the invention preferably includes a pair of semi-cylindrical collars of substantially identical dimension, and which are preferably, but not necessarily, interconnected by a thin hinge strap which can be molded integrally with the semi-cylindrical synthetic resin collars. The collars cooperate, in use, to define, in collective array, a cylinder having a greater outside diameter than the diameter of the opening in the electrical outlet box into which the terminator fitting is to be inserted. In an alternative form of the invention, the two collars may be molded as a single integral unit of cylindrical form.

At the radially inner side of the two semi-cylindrical collars, each collar carries a projection which may, in a preferred embodiment, be in the form of an arcuate rib. The projection is adapted to interfit with and engage the corrugations carried on the exterior of a flexible conduit which is to be connected to the electrical outlet box. As an alternative to such conduit-engaging arcuate ribs, the collars may instead carry yieldable, flexible tongues or tabs, by which engagement with the described corrugated conduit can be effected.

Each one of the semi-cylindrical collars in the pair carries two circumferentially spaced, box-engaging, arcuate projections. These projections extend axially from one end of each of the semi-cylindrical collars. In being molded of a resilient synthetic resin and formed integrally with the collars, the projections are yieldable in a radially inward direction to permit these projections to be displaced by a sufficient amount to be forced through the circular opening in the side wall of an electrical outlet box. Each of the box-engaging projections includes a wedge-shaped free end portion at its terminus spaced from the respective semi-cylindrical collar upon which it is carried, and each projection also includes a hinging web portion by which the wedge-shaped free end portion is connected to the respective semi-cylindrical collar upon which it is carried. Each of the wedge-shaped end portions defines, with the respective semi-cylindrical collar, an arcuate channel, relief or groove extending circumferentially across the respective box-engaging projection. The channel or relief thus defined adjacent the axially inner side of each semi-cylindrical collar is dimensioned for receiving, and relatively snugly engaging, the portion of the wall of the electrical outlet box which surrounds and defines the opening into which the terminator fitting is snapped during the assembly of the system.

The present invention provides as one improvement in a terminator fitting structure, a first blocking flange which is molded integrally to each of one of the two box-engaging projections on each collar at a location adjacent an axial edge thereof. This first blocking flange extends from the respective box-engaging projection upon which it is mounted in a circumferential direction preferably to a point where the free end of the blocking flange lies immediately adjacent an axial edge of the other of the two box-engaging projections carried on the same respective semi-cylindrical collar. Each blocking flange thus substantially fills one of the curcumferential gaps or spaces between the two adjacent box-engaging projections carried on the semi-cylindrical collar. Yet, it is preferably free to flex inwardly as may be needed to allow it to slide beneath one of the box-engaging projections as the terminator fitting is being snapped into the opening into which it is to be received when mounted in the electrical outlet box.

Carried on the second of the two box-engaging projections mounted on the respective semi-cylindrical collar is a second, narrower blocking flange which also has one of its ends molded integrally with, and secured beneath an edge portion of, this second box-engaging projection. This blocking flange also extends circumferentially from the axial edge portion of this second box-engaging projection to a location where it is adjacent the axial edge of one of the box-engaging projections carried on the second or other of the semi-cylindrical collars.

Both semi-cylindrical collars, box-engaging projections and the blocking flanges carried thereon are identically constructed. The second of the semi-cylindrical collars and its respective associated box-engaging projections and blocking flanges is thus described as being constructed in accordance with the description appearing above as characterizing one of the semi-cylindrical collars and its associated pair of projections.

An important advantage of the present invention is that the insulated electrical conductors, which extend through a corrugated conduit engaged by the terminator fitting and into an electrical outlet box in which the fitting is mounted, cannot be pulled back into the gap between adjacent box-engaging projections carried on each of the semi-cylindrical collars, and there be sawed back and forth to destroy the integrity of the insulation on the electrical conductor, or perhaps cause a complete break to occur in the conductor. The spaces between adjacent box-engaging projections are effectively blocked by the blocking flanges which are provided. Yet these flanges are positioned and oriented in such a way with respect to the remainder of the structure that they do not interfere in any way with the inward flexure of the box-engaging projections, which inward flexure is required in order to permit the terminator fitting to be snapped into the opening in the side of the electrical outlet box.

Another important object of the invention is to provide a terminator fitting which is improved in its construction in that it does not interfere with, or cause damage to, electrical conductors passed therethrough and into the interior of an electrical outlet box in which the fitting is mounted.

An additional object of the invention is to provide an improved terminator fitting which can be quickly and easily snapped into an electrical outlet box and concurrently grip and engage a corrugated flexible conduit through which an electrical conductor is to be extended to reach to, and inside of, the electrical outlet box, which terminator fitting is characterized by a long and trouble-free operating life.

Additional objects and advantages will become apparent as the following detailed description of the invention is read in conjunction with the accompanying drawings which illustrated a preferred embodiment of the invention.

GENERAL DESCRIPTION OF THE DRAWINGS

FIG. 1 is a side elevation view of a preferred embodiment of the terminator fitting of the invention.

FIG. 2 is a side elevation view of the terminator fitting shown in FIG. 1, but illustrating the fitting after it has been rotated 90° from its position shown in FIG. 1.

FIG. 3 is an end elevation view of the terminator fitting depicted in FIG. 1.

FIG. 4 is a sectional view of the terminator fitting of the invention illustrated as it appears in use for coupling a corrugated flexible conduit to an electrical outlet box.

FIG. 5 is a detail view of a portion of the terminator fitting in use.

FIG. 6 is an end elevation view of a preferred embodiment of the terminator fitting of the invention as it appears when opened out to a conduit-receiving position.

DETAILED DESCRIPTION OF A PREFERRED EMBODIMENT OF THE INVENTION

Figure 7:
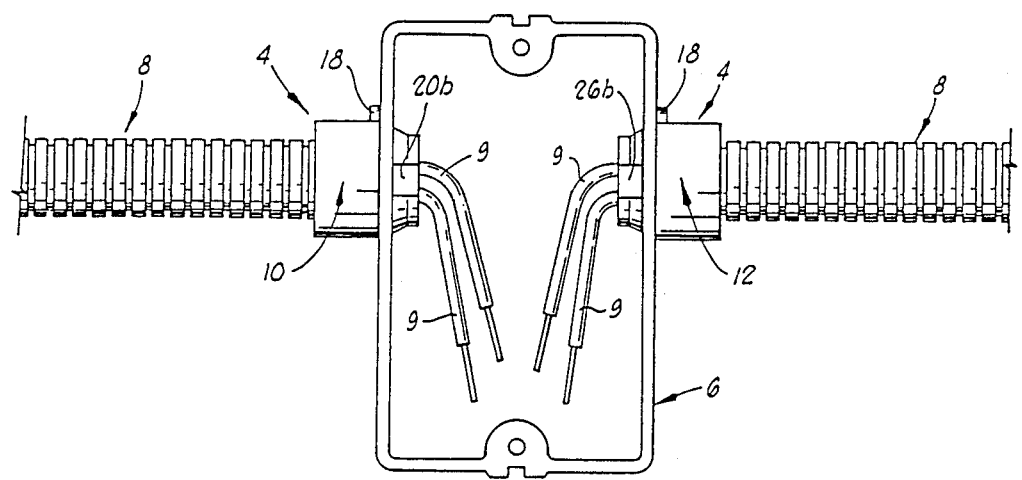
FIG. 7 is an elevation view of an electrical service system constructed in accordance with the invention.

In a broad aspect, the present invention relates to an improved electrical service system in which a terminator fitting 4 is engaged with an electrical outlet box 6 by insertion in a circular opening 7 therethrough, and functions to connect a flexible corrugated conduit 8 to the box. This system, as illustrated in FIG. 7, further includes insulated electrical conductors 9 which extend through the conduit 8, through the terminator fitting 4 and into the interior of the box 6.

The terminator fitting 4, in a preferred form, includes a pair of semi-cylindrical collars 10 and 12 which are substantially identical in configuration. In another, less preferred form, the collars may be a single, unitary cylindrical collar element. The collars 10 and 12 are preferably constructed of a suitable synthetic resin, such as polyphenyleneoxide base resin or a polyphenylene ether copolymer, and each includes a convex semi-cylindrical external surface 14 and a concave semi-cylindrical internal surface 16. Carried on the inner surface 16 of each of the semi-cylindrical collars 10 and 12 is at least one radially inwardly projecting arcuate locking rib or ridge 15 which is axially spaced from an arcuate stop flange 19 and is radially dimensioned to engage one of the annular grooves formed around the exterior of a flexible corrugated conduit 8. Such conduit 8 is typically used in electrical service systems for containing, and acting as a raceway for, one or more flexible electrical conductors, as illustrated at 9 in FIG. 7.

The semi-cylindrical collars 10 and 12 are preferably interconnected by a relatively narrow flexible strap 18 which is molded integrally with the two collars, and has its opposite ends connected to the respective collars adjacent the diametric plane which is defined by the relatively broad axial edge portions 17 of each of the two semi-cylindrical collars. Thus, the collars can be folded out with respect to each other so as to occupy the position illustrated in FIG. 6 of the drawings. Alternatively, the two hingedly interconnected collars can be folded together to occupy the positions shown in FIG. 3 of the drawings in which the relatively broad axial edge portions 17 of the collars abut each other along the described diametric plane so as to conjointly form a cylindrical figure of the sort shown in FIGS. 1-3 of the drawings.

It should be pointed out that in a preferred method of constructing the terminator fitting of the invention, the fitting is formed by an injection molding procedure in which all of the parts of the fitting are integrally formed with all other parts. As earlier noted, however, the two collars 10 and 12 need not necessarily be interconnected to each other by a strap, and it is also possible to construct the terminator fitting 4 with a single, integrally molded cylindrical unit replacing the two semi-cylindrical collars.

Each pair of the semi-cylindrical collars 10 and 12 carries a pair of spaced, axially projecting box-engaging projections. For clarity of discussion and illustration, the two box-engaging projections carried on the collar 12 are denominated by reference numerals 20 and 22, whereas the box-engaging projections carried on the semi-cylindrical collar 10 are denominated by reference numerals 24 and 26. As will be better understood as the following description proceeds, the box-engaging projections 20 and 26 are substantially identical to each other in construction, configuration and function, and the box-engaging projections 22 and 24 are substantially identical to each other in construction, configuration and function.

Each of the box engaging projections 20-26 is of arcuate, transverse cross-sectional configuration, with each being formed substantially on an arc of a circle. Such arc is preferably slightly less than a quadrant of a circle, or, stated differently, subtends slightly less than 90°. It will be noted that the arcuate box-engaging projection 20 is separated from the box-engaging projection 22 by a circumferential space or gap 28, and that the box-engaging projections 24 and 26 are also separated from each other by a similar circumferential space or gap 30. The projection 20 is also spaced from the projection 24 by an intervening gap 31, and a gap 33 separates the projection 22 from the projection 26. As previously mentioned, each of the arcuate box-engaging projections 20-26 extends in an axial direction from one end, hereinafter termed the axially inner end, of the respective semi-cylindrical collar 10 or 12 upon which it is carried. The box-engaging projections 20-26 in collective array form a generally cylindrical figure.

Each of the arcuate box-engaging projections 20-26 is joined by a web portion 32 to the respective semi-cylindrical collar 10 or 12 upon which it is mounted. The web portion 32 has a relatively thin radial dimension, and a relatively narrow circumferential dimension, to thus permit the remaining part of the respective box-engaging projection to flex and pivot radially inwardly as the terminator fitting is pressed into its operative position within the opening of an electrical outlet box as shown in FIG. 4. Stated differently, each of the box-engaging projections 20-26, as the outer surface thereof encounters the defining boundary of the circular opening through the box, can undergo radially inward movement by flexure about the hinge constituted by the interconnecting web portion 32. The resilience of the synthetic resin of which the terminator fitting 4 is constructed will then cause the respective box-engaging projections 20-26 to spring back into their box-engaging positions. These positions are illustrated in FIG. 4 after the free inner ends of the projections, which are of a wedge-shaped configuration, have passed through the box opening. The several wedge-shaped inner ends of the box-engaging projections 20-26 are denominated in the several figures of the drawings by the respective reference numerals 20a-26a.

It will be noted in referring to FIGS. 1 and 2 that the circumferential width of the web portion 32 by which each of the box-engaging projections 20-26 is joined to the respective semi-cylindrical collars 10 or 12 upon which the respective projection is carried is substantially less than the circumferential width of the wedge-shaped free end portion of the respective projection. The reduced circumferential width and reduced radial thickness of the web portions 32 facilitate the required flexing movement of the box-engaging projections as the terminator fitting is snapped into the opening of the synthetic resin electrical outlet box 6.

An important feature of the terminator fitting 4 is the provision of a plurality of blocking flanges which prevent electrical conductors 9 extended through the fitting and into the electrical outlet box 6 from being pulled between the circumferentially-spaced, box-engaging projections 20-26. The circumferential spaces 28, 30, 31 and 33 at these locations between the several projections 20-26 have previously presented the problem of permitting insulated electrical conductors 9 passed through the flexible 8 conduit and the fitting 4 and into an electrical outlet box 6 to become jammed in such spaces. The conductors 9 then chafe and wear as they undergo any movement so as to sever the insulation and, in extreme instances, to even sever the electrical conductor. In some cases, jamming of an insulated electrical conductor 9 into the circumferential space between two of the flexible box-engaging projections 20-26 has interfered with the ability to push or pull and manipulate the conductor 9 so as to effect connection to a contact within the electrical outlet box 6, or to remove slack from the conductor where such slack exists within the box and during the course of installation of the system.

As illustrated in the drawings, and particularly in FIGS. 3, 6 and 7, each of the box-engaging projections 20 and 26 carries an elongated arcuate blocking flange 20b and 26b, respectively. The blocking flanges 20b and 26b are molded integrally to the underside of the respective box-engaging projections 20 and 26 near the axial side or edge thereof. In projecting circumferentially away from this axial side or edge, each of the blocking flanges 20b and 26b project across at least a major portion of the intervening circumferential space, and preferably to a location immediately adjacent one side of the other box-engaging projection in the pair carried on the same one of the respective semi-cylindrical collars 10 and 12. The blocking flanges 20b and 26b will be perceived to be positioned so that, as the several box-engaging projections 20-26 undergo radially inward movement as they are pressed through the opening in an electrical outlet box 6, the blocking flanges can pass clear of the respective box-engaging projections by extending below the radially inner side thereof with a very slight clearance existing along the radially inner surface of the respective projection 22 or 24 and the adjacent blocking flange.

In similar fashion, the box-engaging projections 22 and 24 carry circumferentially extending blocking flanges 22b and 24b, respectively, as best illustrated in FIGS. 3 and 6. The blocking flanges 22b and 24b are molded to the underside of the respective box-engaging projection 22 and 24, and adjacent one edge thereof. The flanges 22b and 24b project circumferentially from the respective box-engaging projection toward the radially inner surface of the adjacent one of the several box-engaging projections.

As will be perceived in referring to FIG. 3, at a time, for example, when the terminator fitting 4 is to be pressed through the opening in the wall of an electrical outlet box, the arcuate box-engaging projections 22 and 24 flex inwardly about the web portions 32 by which these projections are joined to the semi-cylindrical collars 10 and 12 upon which they are carried. At this time, the blocking flange 22b will move circumferentially along the inner side of the box-engaging projection 26 and will not prevent either the box-engaging projection 26 or the box-engaging projection 22 from flexing radially inwardly. The same relationship exist with respect to the box-engaging projection 24, its blocking flange 24b and the box-engaging projection 20.

In the utilization of the illustrated embodiment of the terminator fitting 4, the two semi-cylindrical collars 10 and 12, joined by the thin, narrow flexible strap 18, are opened out to the position illustrated in FIG. 6. A flexible corrugated conduit 8 having alternating ribs and troughs in the external surface thereof is then placed against one of the semi-cylindrical collars 10 or 12 so that the radially inwardly projecting rib 15 on that collar engages one of the troughs or grooves in the external surface of the conduit. The end face of the conduit 8 then bears against the arcuate stop flanges 19. The other of the two semi-cylindrical collars 10 and 12 is then folded to a closed position as illustrated in FIG. 3, so that its radially inwardly projecting rib 15 also passes into and engages the groove or trough formed in the external surface of the corrugated conduit 8.

With the flexible corrugated conduit positioned between the semi-cylindrical collars 10 and 12 in the manner described, the terminator fitting 4 is pressed through the opening in the side wall of the box 6 by initially inserting the inner end of the fitting (the end having a radially smaller diameter) into the opening through the box, and forcing the arcuate box-engaging projections 20-26 into the box until they snap engage the box where it surrounds the opening 7 therethrough. Stated differently, the terminator fitting 4 is forced inwardly through the opening in the box 6 until the edge of the box wall around the opening 7 comes to rest within, and to occupy, the groove or recess segments defined by the several wedge-shaped end portions 20a-26a of the projections 20-26, the web portions 32 and the two semi-cylindrical collars 10 and 12. As the terminator fitting 4 is being pressed into its interlocked operative position, the several box-engaging projections 20-26 can be flexed radially inwardly, as has been previously described, with the several blocking flanges 20b-26b clearing the adjacent projections, and avoiding any sort of interference or contact with these projections which would preclude the box-engaging projections 20-26 from undergoing the necessary inward flexure to permit the terminator to be snap engaged with the box 6.

In installations where the grooves and ribs around the exterior of the conduit 8 are of a helical or spiral shape, and mate with identically configured ribs 15 provided on the terminator fitting 4, the corrugated conduit 8 can be further screwed into the fitting toward the interior of the flexible outlet box toward the blocking flanges 20b-26b. These flanges are positioned radially inwardly with respect to the remaining radially inner surfaces carried on the wedge-shaped free end portions 20a-26a of the arcuate box-engaging projections 20-26. The conduit 8 will then ultimately be forced against the several blocking flanges 20b-26b, and will, by such contact, tend to force the box-engaging projections 20-26 radially outwardly slightly so as to more firmly grip the wall of the box 6 between the collars 10 and 12 and the radially thickest portion of the wedge-shaped free end portions 20a-26a end portions. This will firmly lock the terminator fitting in position within the opening in the box, and will also tend to prevent further inward or outward movement of the corrugated conduit.

From the foregoing description of the invention, it will be perceived that the present invention provides an improved terminator fitting for use in connecting a flexible corrugated conduit or pipe to an electrical outlet box. The use of the blocking flanges located in the positions described affords a reliable safeguard against electrical conductors becoming jammed into the space between adjacent box-engaging projections forming a part of the fitting, and assures that the fittings will have a longer and more trouble-free operating life.

Although a preferred embodiment of the invention has been herein described in order to illustrate the basic principles which underlie the invention, various changes and innovations can be made in the illustrated and described structure without departure from these basic principles. All such changes and innovations are therefore deemed to be circumscribed by the spirit and scope of the invention, except as the same may be necessarily limited by the appended claims or reasonable equivalents thereof.

What is claimed is:

1. A terminator fitting for utilization in connecting a corrugated conduit to an electrical outlet box comprising:
   a pair of identically shaped semi-cylindrical collars adapted to cooperatively interfit to form a cylindrical hollow collar dimensioned to receive in the hollow interior thereof, a corrugated conduit, each of said semi-cylindrical collars including a convex outer surface and a concave inner surface, and each of said collars having secured to the concave inner surface thereof, at least one radially inwardly projecting arcuate rib adapted to engage the corrugations of a flexible corrugated conduit placed within said terminator fitting;
   a pair of circumferentially spaced, arcuate box-engaging projections projecting axially from one end of each of said semi-cylindrical collars, each of said box-engaging projections including a tapered wedge-shaped free end portion spaced from the respective collar upon which the respective box-engaging projection is carried, and a web portion interconnecting the wedge-shaped free end portion with the respective collar upon which the box-engaging projection is mounted, said web portion, wedge-shaped free end portion and the respective collar defining an arcuate groove dimensioned to receive a portion of the wall of an electrical outlet box surrounding and defining an opening into which said terminator fitting is adapted to be inserted, said grooves, as defined by the several box-engaging projections and collars, lying in a common plane; and
   a blocking flange extending circumferentially from each of said box-engaging projections toward the adjacent box-engaging projection and at least partially filling the circumferential space between the adjacent box-engaging projections.

2. A terminator fitting as defined in claim 1 wherein said web portion is substantially narrower in a circumferential direction than said wedge-shaped free end portion, whereby said free end portion can more easily flex radially inwardly by the bending and flexing of said web portion.

3. A terminator fitting as defined in claim 2 wherein said web portion has a substantially lesser radial thickness than said wedge-shaped free end portion.

4. A terminator fitting as defined in claim 2 wherein said semi-cylindrical collars are pivotally interconnected for pivotation about an axis which extends parallel to the axes of said semi-cylindrical collar.

5. A terminator fitting as defined in claim 4 wherein said web portion has a substantially lesser radial thickness than said wedge-shaped free end portion.

6. A terminator fitting as defined in claim 2 wherein said semi-cylindrical collars are interconnected by a flexible strap.

7. A terminator fitting as defined in claim 2 wherein said terminator fitting is a unitary article of molded synthetic resin.

8. A terminator fitting as defined in claim 1 wherein said web portion has a substantially lesser radial thickness than said wedge-shaped free end portion at the point where said web portion joins said wedge-shaped free end portion, whereby said web portions collectively form the bottom of said grooves adapted to receive said portion of the wall of an electrical outlet box which defines the opening into which said terminator fitting is adapted to be inserted.

9. A terminator fitting as defined in claim 1 wherein said semi-cylindrical collars are pivotally joined to each other by a flexible strap.

10. A terminator fitting as defined in claim 1 wherein said terminator fitting is a unitary article of molded synthetic resin.

11. A terminator fitting as defined in claim 1 wherein each of said blocking flanges extends across the circumferential space between an adjacent pair of said box-engaging projections and terminates at a location adjacent a box-engaging projection adjacent that box-engaging projection from which it extends.

12. A synthetic resin terminator fitting for utilization in connecting the end of an externally ribbed, flexible synthetic resin conduit to an electrical outlet box comprising:
    a generally cylindrical collar having a bore therethrough, and having an outer end and an inner end;
    means projecting radially inwardly into said bore from said collar for engaging at least one of the external ribs on a flexible, synthetic resin tubular conduit placed substantially concentrically in said collar and thereby limiting the movement of said conduit relative to said collar;
    at least four circumferentially spaced, arcuate projections formed integrally with the inner end of said collar, projecting axially therefrom, and collectively positioned symetrically around the projected axis of said cylindrical collar, each of said arcuate projections including:
    a wedge-shaped free end portion having a relatively thin end and having a relatively thick butt end spaced from the thin end; and
    a web portion of substantially lesser thickness than said butt end of said wedge-shaped free end portion and interconnecting said free end portion with said collar at the inner end of the collar, each of said web portions having a circumferential width less than the circumferential width of the respective wedge-shaped free end portion which the respective web portion connects to said collar; and
    a blocking flange extending in a circumferential direction from a lateral edge of each of said wedge-shaped free end portions, each of said blocking flanges being positioned in the circumferential space between adjacent arcuate projections.

13. A synthetic resin terminator fitting as defined in claim 12 wherein said generally cylindrical collar comprises a pair of complementary semi-cylindrical parts.

14. A synthetic resin terminator fitting as defined in claim 12 wherein said means projecting radially inwardly into said bore from said collar comprises at least one rib fixed to said collar.

15. A terminator fitting for utilization in connecting a corrugated conduit to an electrical outlet box comprising:
- a pair of identically shaped semi-cylindrical collars adapted to cooperatively interfit to form a cylindrical hollow collar dimensioned to receive in the hollow interior thereof, a corrugated conduit, each of said semi-cylindrical collars including a convex outer surface and a concave inner surface, and each of said collars having secured to the concave inner surface thereof, at least one radially inwardly projecting arcuate rib adapted to engage the corrugations of a flexible corrugated conduit placed within said terminator fitting:
- a pair of circumferentially spaced, arcuate box-engaging projections projecting axially from one end of each of said semi-cylindrical collars, each of said box-engaging projections including:
- a tapered wedge-shaped free end portion spaced from the respective collar upon which the respective box-engaging projection is carried; and
- a web portion interconnecting the wedge-shaped free end portion with the respective collar upon which the box-engaging projection is mounted, said web portion, wedge-shaped free end portion and the respective collar defining an arcuate groove dimensioned to receive a portion of the wall of an electrical outlet box surrounding and defining an opening into which said terminator fitting is adapted to be inserted, said several grooves, as defined by the several box-engaging projections and collars, lying in a common plane; and
- a blocking flange extending circumferentially from each of said box-engaging projections toward the adjacent box-engaging projection and at least partially filling the circumferential space between the adjacent box-engaging projections, each of said blocking flanges being positioned radially inwardly of the arcuate radially inner side surfaces of said arcuate box-engaging projections, whereby said blocking flanges are positioned to limit movement of a corrugated conduit through said fitting and into an electrical outlet box.

16. A terminator fitting for utilization in connecting a corrugated conduit to an electrical outlet box comprising:
- a pair of identically shaped, semi-cylindrical collars adapted to cooperatively interfit to form a cylindrical hollow collar dimensioned to receive in the hollow interior thereof, a corrugated conduit, each of said semi-cylindrical collars including a convex outer surface and a concave inner surface, and each of said collars having secured to the concave inner surface thereof, at least one radially inwardly projecting arcuate rib adapted to engage the corrugations of a flexible corrugated conduit placed within said terminator fitting:
- a pair of circumferentially spaced, arcuate box-engaging projections projecting axially from one end of each of said semi-cylindrical collars, each of said box-engaging projections including:
- a tapered wedge-shaped free end portion spaced from the respective collar upon which the respective box-engaging projection is carried; and
- a web portion interconnecting the wedge-shaped free end portion with the respective collar upon which the box-engaging projection is mounted, said web portion, wedge-shaped free end portion and the respective collar defining an arcuate groove dimensioned to receive a portion of the wall of an electrical outlet box surrounding and defining an opening into which said terminator fitting is adapted to be inserted, said grooves, as defined by the several box-engaging projections and collars, lying in a common plane, each of said web portions being substantially narrower in a circumferential direction than the respective wedge-shaped free end portion to which it is attached, whereby said free end portion to which said web portion is connected can more easily flex radially inwardly by the bending and flexing of said web portion; and
- a blocking flange extending circumferentially from each of said box-engaging projections toward the adjacent box-engaging projection and at least partially filling the circumferential space between the adjacent box-engaging projections, each of said blocking flanges being positioned radially inwardly of the arcuate radially inner side surfaces of said arcuate box-engaging projections, whereby said blocking flanges are positioned to limit movement of a corrugated conduit through said fitting and into an electric outlet box, said terminator fitting being a unitary article of molded synthetic resin.

17. A terminator fitting as defined in claim 16 wherein said web portion has a substantially lesser radial thickness than said wedge-shaped free end portion.

18. An electrical service system comprising:
- an electrical outlet box having a generally circular opening through a wall thereof;
- a synthetic resin terminator fitting pressed into said opening so that a part of said fitting is within said box and a part of said fitting is outside said box, said terminator fitting comprising:
- a generally cylindrical hollow collar located outside of said box and having a bore therethrough defined by an arcuate, concave inner side wall, said hollow collar having secured to the concave inner side wall thereof at least one radially inwardly projecting rib means;
- four circumferentially spaced, arcuate, box-engaging projections extending axially from one end of said generally cylindrical collar, and spaced from each other concentrically around the axis of the cylindrical collar, each of said box-engaging projections including:
- a tapered free end portion spaced from the cylindrical collar; and
- a web portion interconnecting the respective free end portion to the generally cylindrical hollow collar, said web portions, free end portions and generally cylindrical hollow collar defining an arcute groove immediately adjacent said one end of said generally cylindrical hollow collar, said groove being dimensioned to receive therein that portion of said electrical outlet box which surrounds and defines said opening into which said terminator fitting is inserted so that said free end portions of said box-engaging projections are that part of said terminator fitting which is located within said box;
- a blocking flange extending circumferentially from the free end portion of each of said box-engaging projections toward the adjacent box-engaging projection and substantially filling a major portion of the circumferential space between adjacent box-engaging projections;

an elongated, flexible corrugated synthetic resin conduit having an end portion within the bore of said cylindrical collar and having external, alternating ribs and depressions, with the depressions engaging the rib means projecting radially inwardly from the inner side wall of said cylindrical collar; and insulated electrical conductors projecting through said conduit into the interior of said box at a location radially inwardly from said blocking flanges.

19. A terminator fitting as defined in claim 18 wherein said cylindrical collar is made of two parts movably interconnected to facilitate the selective placement therewithin of sections of flexible corrugated conduit of variable outside diameter.

20. A synthetic resin terminator fitting for utilization in connecting the end of an externally ribbed, flexible, synthetic resin conduit to an electrical outlet box comprising:

a generally cylindrical collar having a bore therethrough, and having an outer end and an inner end;

means projecting radially inwardly into said bore from said collar for engaging at least one of the external ribs on a flexible, synthetic resin tubular conduit placed substantially concentrically in said collar, and thereby limiting the movement of said conduit relative to said collar;

at least four circumferentially-spaced, arcuate projections formed integrally with the inner end of said collar, projecting axially therefrom, and collectively positioned symmetrically around the projected axis of said cylindrical collar, each of said arcuate projections including:

a wedge-shaped free end portion having a relatively thin end and having a relatively thick butt end spaced from the thin end; and a web portion of substantially lesser thickness than said butt end of said wedge-shaped free end portion and interconnecting said free end portion with said collar at the inner end of the collar; and a blocking flange extending in a circumferential direction from a lateral edge of each of said wedge-shaped free end portions, each of said blocking flanges being positioned in the circumferential space between adjacent arcuate projections and extending across the circumferential space between an adjacent pair of said box-engaging projections so as to terminate at a location adjacent a box-engaging projection adjacent that box engaging projection from which it extends, each of said blocking flanges further having an edge lying in a plane extending perpendicular to the axis of said cylindrical collar of said terminator fitting, and being colinear and coplanar with the free terminal edge of the respective wedge-shaped free end portion of the respective arcuate projection from which the blocking flange extends.

* * * * *